United States Patent [19]
Cervenak

[11] 3,709,269
[45] Jan. 9, 1973

[54] LOG BARKER RING POSITION CONTROLLER

[75] Inventor: Peter J. Cervenak, Seattle, Wash.

[73] Assignee: Nicholson Manufacturing Company, Seattle, Wash.

[22] Filed: March 12, 1971

[21] Appl. No.: 123,599

[52] U.S. Cl. ............... 144/208 E, 144/246, 143/55
[51] Int. Cl. ........................................ B27l 1/00
[58] Field of Search ............... 144/208 R, 208 E, 144/246 R, 246 A, 246 C, 246 D, 246 G; 143/55 R, 55 A, 55 B

[56] References Cited

UNITED STATES PATENTS

| | | | |
|---|---|---|---|
| 2,908,302 | 10/1959 | Mullis, Sr. | 144/208 E |
| 2,925,107 | 2/1960 | Fitzwater | 144/208 E |
| 3,361,168 | 1/1968 | Brown | 144/208 E |

Primary Examiner—Andrew R. Juhasz
Assistant Examiner—W. Donald Bray
Attorney—Robert W. Beach

[57] ABSTRACT

A rotary log barker ring and a log hold-down are suspended from a lever beam swingable to raise or lower the hold-down twice as far as the barker ring, for centering the barker ring relative to a log to be barked when the hold-down engages the upper surface of the log. The position of the barker ring is maintained briefly after the log has moved out of engagement with the hold-down to enable the trailing end of the log to clear the barker ring before the ring is shifted into a predetermined position of rest or a position centered with respect to the next log.

9 Claims, 5 Drawing Figures

PATENTED JAN 9 1973

INVENTOR
PETER J. CERVENAK
BY
Robert W. Beach
ATTORNEY

LOG BARKER RING POSITION CONTROLLER

A principal object of the invention is to insure that the rotary barker ring of a log barker will be centered accurately with respect to the axis of a log being barked, so that the barking tools will travel uniformly around the log and stress in the barker ring and its associated parts will be minimized.

Another object is to provide mechanism for thus centering the barker ring which will operate automatically without attention on the part of the operator.

A further object is to support the barker ring floatably rather than rigidly so that its position can be shifted momentarily in response to irregularities in a log or during transition from one log to another without subjecting the barking apparatus to substantial stress.

It is also an object to provide a barker ring having the aforesaid capabilities in a barker which is of simple and reliable construction.

FIG. 5 is an enlarged fragmentary side elevation of the barker ring suspension mechanism with parts broken away.

Figure 1:
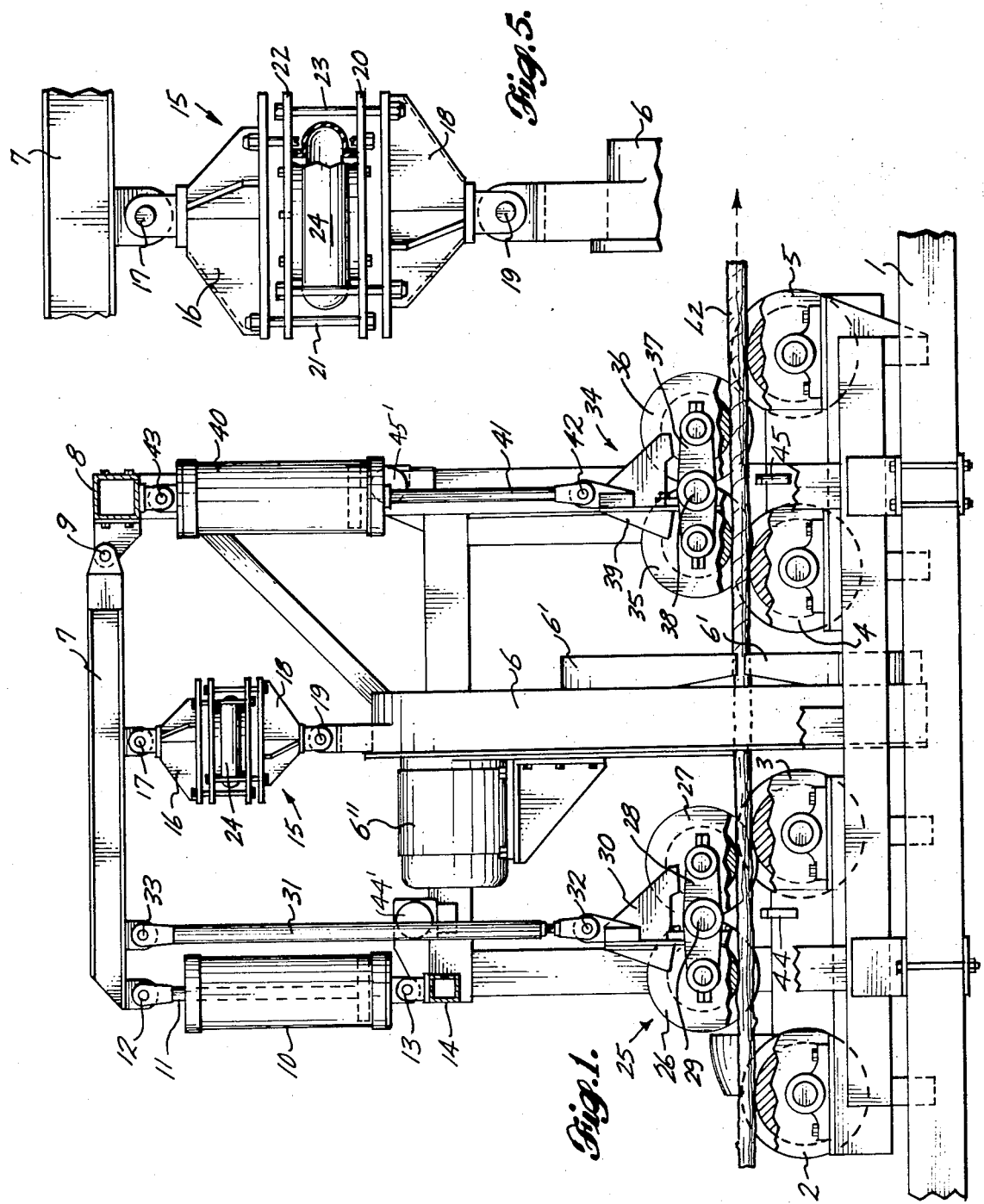
FIG. 1 is a side elevation of a rotary ring log barker constructed according to the present invention.

The chassis of the log barker according to the present invention is conventional and includes a base 1 and log-supporting chain conveyors spaced along the path of movement of the log L1 or L2. One of these chain conveyors, including sprockets 2 and 3, is located on the infeed side of the rotary barker ring 6, and the other chain conveyor, including sprockets 4 and 5 is located on the outfeed or discharge side of such ring. Such chain conveyors move a log lengthwise through the barker ring.

The barker ring 6 includes a frame in which a rotary ring is mounted for rotation relative to the frame. Such ring carries swingable barking arms 6', the swinging ends of which are pressed against a log to scrape the bark from it as the log travels lengthwise through the barker ring. Such ring is rotated relative to its frame by a motor 6" mounted on the frame.

The barker ring assembly is suspended from a lever beam 7, one end of which is supported from an upright frame 8 at the outfeed end of the barker by a pivot 9. Such lever beam can be swung about such pivot into various positions, such as the solid-line position of FIG. 1 and the solid-line and broken-line positions of FIG. 2, by an air-pressure-operated jack 10, the plunger 11 of which is connected to the swinging end of the lever beam 7 remote from frame 8 by a pivot 12. The lower end of the jack is supported by a pivot 13 on a frame 14 spaced from the frame 8 lengthwise of the barker.

The frame 8 supporting the pivoted or fulcrum end of the lever beam 7 is located at the discharge side of the barker ring assembly 6, and the beam-adjusting jack 10 is located at the infeed side of the barker ring. Preferably the frames 8 and 14 are located approximately equidistant from the barker ring so that the barker ring assembly will be disposed under the central portion of the lever beam. The barker ring assembly is floatably supported from the central portion of the beam by the connecting mechanism 15, and is guided for elevational movement by suitable ways.

As shown best in FIG. 5, the connecting mechanism 15 includes an upper supporting plate section 16 connected to the central portion of the lever beam 7 by pivot 17 and a lower supporting plate section 18 connected to the barker ring assembly by a pivot 19. A lower suspension plate 20 of circular shape is suspended from the upper supporting plate structure 16 by rods 21, which may be bolts. An upper suspension plate 22 is connected to the lower supporting plate section 18 by rods 23, which also may be bolts.

The suspension plates 20 and 22 are connected by a gas-filled compression chamber 24 having flexible walls preferably formed of elastomer material. Approach movement of the plates 20 and 22 is limited by compression of the gas in the chamber, but normally such resilient member does not exert any appreciable force opposing separating movement of such plates. If an unusual upward force should be exerted on the barker ring, however, the chamber 24 would be compressed between plates 20 and 22 to cushion upward movement of the barker ring.

When there is no log supported on the chain conveyors including the sprockets 2, 3 and 4, 5 extending through the barker ring 6, the weight of the barker ring assembly will be resiliently supported by the resilient chamber 24 interposed between the plates 20 and 22 and limiting downward movement of plate 22 from which lower supporting plate 18 and barker ring 6 are suspended by rods 23. The degree to which the chamber 24 is inflated will alter the yieldability of the barker ring. Alternatively the resilient member 24 could be of solid rubber, and the degree of resiliency would depend upon the hardness of the rubber. A spring structure utilizing either helical compression springs or leaf springs could be used in the resilient connection between the barker ring 6 and the lever beam 7.

The infeed hold-down assembly 25 includes an entrance hold-down roller 26 and an exit hold-down roller 27 journalled in the opposite ends, respectively, of the rocker frame 28. Such rocker frame is mounted by a central pivot 29 carried by the support 30. Such support is pivotally mounted on the lower end of the upright link 31 by pivot 32. The upper end of such link is connected to the swinging end portion of lever beam 7 by pivot 33.

The outfeed hold-down assembly 34 includes an entrance hold-down roller 35 and an exit hold-down roller 36 journalled in the opposite ends, respectively, of the rocker frame 37. Such rocker frame is mounted by the central pivot 38 on the support 39. Such support is carried by an air-pressure-operated jack including the cylinder 40 and the piston rod 41. Such support is connected to the lower end of the piston rod by pivot 42, and the cylinder is suspended from the outfeed end frame 8 by pivot 43.

Figure 2:
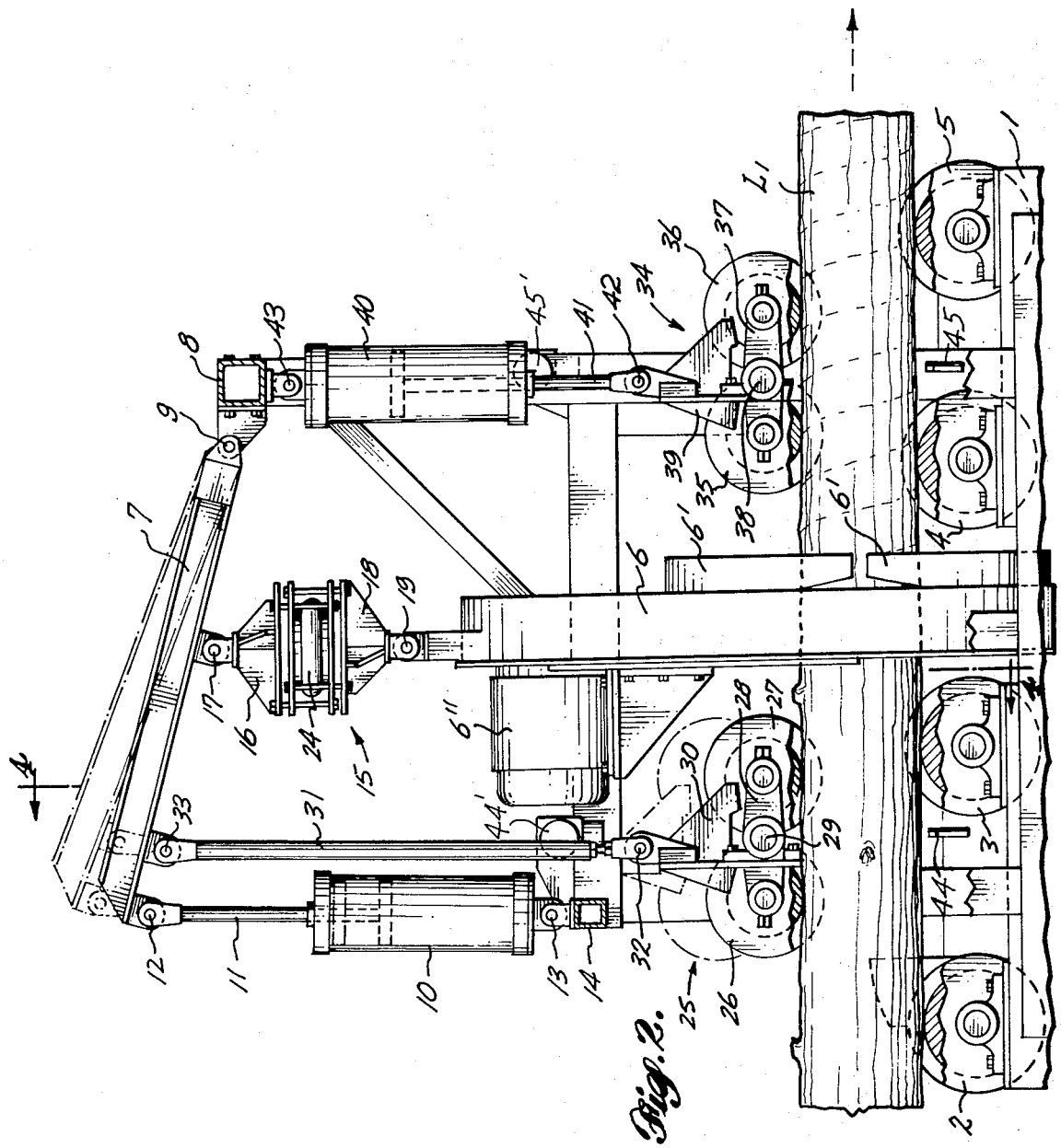
FIG. 2 is a simiar view showing parts in a different relationship, parts being broken away in each instance.
Figure 3:
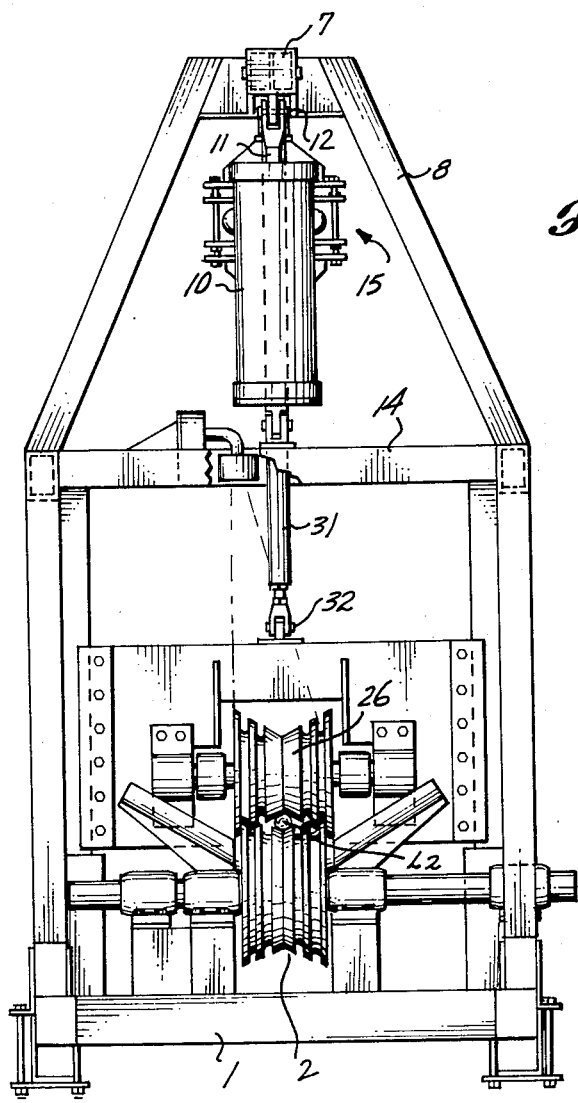
FIG. 3 is a front end elevation of the barker with parts shown in the position of FIG. 1, parts being broken away.
Figure 4:
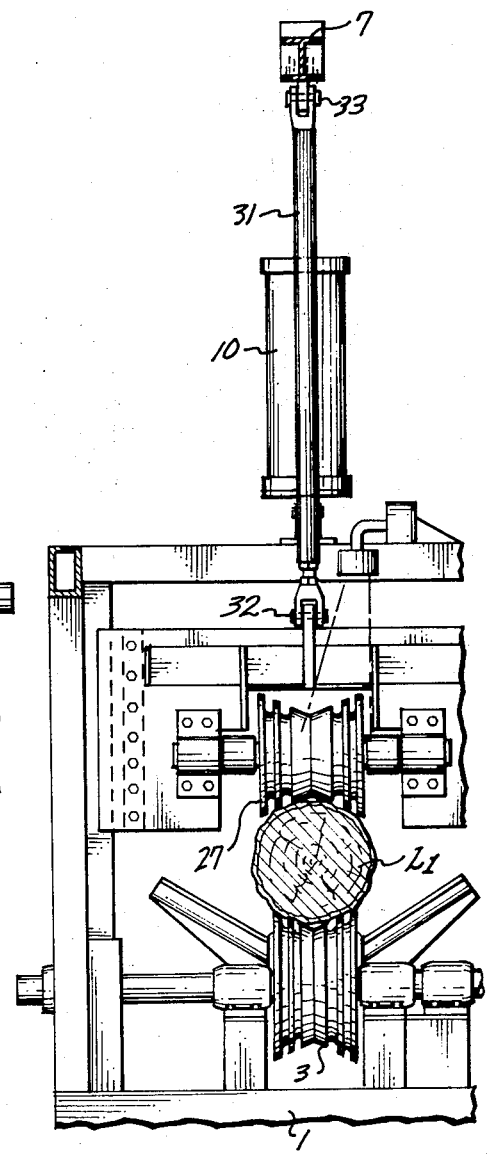
FIG. 4 is a transverse vertical section through the barker taken on line 4—4 of FIG. 2 with parts shown in the position of FIG. 2, and having parts broken away.

The air jack 10,11 will be in an extended condition holding the hold-down assembly 25 raised to the broken-line predetermined rest position shown in FIG. 2, and the jack 40,41 will be in a contracted condition holding the hold-down assembly 34 raised to a corresponding predetermined rest position prior to initiation of a barking operation. The infeed hold-down assembly 25 and the outfeed hold-down assembly 34 will therefore be either in their highest positions, or at least in positions of rest such that the largest logs to be barked during a particular run will pass under the hold-downs. Also the lever beam 7, and consequently the barker ring 6, will be in corresponding raised positions.

If a log of maximum size to be run, such as log L1 shown in FIG. 2, for example, is fed into the barker with the hold-down assemblies 25 and 34 thus raised, the barker ring 6 will also be held in a raised position by the lever beam 7. As the leading end of the log reaches a photoelectric cell 44 beneath the infeed hold-down assembly 25, a beam of light normally projected onto the photoelectric cell by the light source 44' will be interrupted by the log. The photoelectric cell will effect actuation of suitable valve means to release air from the lower portion of jack cylinder 10 so that the hold-down 25 will descend onto the log. At the same time air under higher pressure can be admitted to the upper end of cylinder 10. Normally the air in both ends of the jack cylinder is under pressure. The pressure in the lower end of the cylinder may, for example, be 35 pounds per square inch, and the air supplied under higher pressure to the upper end of the cylinder may be 60 pounds per square inch when a log being barked is engaged by the hold-down 25.

The pressure of air in the upper end of the jack cylinder 10 exceeding the pressure in its lower end, as well as the weight of the hold-down assembly 25 itself, will press the log against the infeed end feed chain conveyor so that it will effect feed of the log into the barker ring in the direction indicated by the arrow in FIG. 2. During such log movement the barker ring 6 will be suspended by lever beam 7 so that the log L1 will extend substantially concentrically through such ring for engagement by the tips of the barking arms 6'. The barker ring can be raised and lowered by the pressure of the engagement of the tips of the barking arms with irregularities on such log.

As the log passes through the barker ring 6 so that its leading end moves under the outfeed hold-down assembly 34, the leading end of the log will pass between the photoelectric cell 45 and the light source 45' directed onto the photoelectric cell. The log will thus interrupt the light beam so that the photoelectric cell will control suitable valve means to release the air under pressure from the lower portion of jack cylinder 40, while the air pressure in the upper end of the cylinder is higher, such as 30 pounds per square inch. The outfeed hold-down assembly will thus be lowered to engage the log. The air under pressure in the upper end of jack cylinder 40 and the weight of the hold-down assembly will press the hold-down onto the log. Such pressure of the hold-down assembly will enable the outfeed end live chain conveyor to assist in moving the log through the barker ring.

When the trailing end of the log L1 moves past the photoelectric cell sensing means 44, the valve means controlling supply of air under pressure to the jack cylinder 10 will be operated to discontinue the supply of air to the upper end of the jack cylinder and to continue supply of air under pressure to the lower end of the jack cylinder to an extent sufficient to support the weight of the hold-down means, the lever beam 7 and the barker ring 6, such as 30 pounds per square inch. Time delay mechanism will delay supply of air under pressure to the lower end of cylinder 10 to raise the hold-down assembly and barker ring for a period sufficient to enable the trailing end of the log to be moved through the barker ring.

Because pivot 17 by which the barker ring assembly 6 is supported from the lever beam 7 is approximately midway between the lever beam pivot 9 and the hold-down link pivot 33, the barker ring will be in a position raised from its lowermost position approximately half the distance that the infeed hold-down assembly 25 is raised. Thus when the hold-down assembly 25 is raised from its lowermost position a distance equal to the diameter of a log such as L1, the barker ring is raised from its lowermost position a distance equal to the radius of such log, so that the center of the barker ring will be located approximately at the elevation of the log center. The log L1 will therefore be fed through the barker ring approximately concentrically with such ring, although the ring will be free to move up and down a limited amount as the tips of the barker arms engage irregularities on the log.

If a much smaller log, such as the log L2 shown in FIG. 1, is fed into the barker, the leading end of this log also will interrupt the light beam from light source 44' directed onto photoelectric cell 44. Again such deenergization of the photoelectric cell will operate control valve mechanism to release air under pressure from the lower portion of jack cylinder 10. In this instance, however, the hold-down assembly 25 will descend much farther from its raised position in which no log is moving through the barker to the position shown in FIG. 1. The barker ring 6 will be lowered correspondingly by downward swinging of the lever beam 7 so that again such barker ring will be located approximately concentrically with the log.

Whatever the size of log being processed, therefore, the movement of the hold-down assembly 25 downward onto the upper surface of the log will effect corresponding movement of the barker ring 6 downward into a position substantially concentric with the log. As the leading end of the smaller log L2 shown in FIG. 1 moves out of the barker ring to intercept the light beam from light source 45' to photoelectric cell 45, the valves controlling the air under pressure in jack cylinder 40 will release the air from the lower end of the cylinder and supply air under pressure to the upper end of the cylinder so that this hold-down assembly also will descend into contact with the upper surface of the log. The descent of this outfeed hold-down assembly will be much greater in this instance than where a larger log such as shown in FIG. 2 is being processed.

When the trailing end of log L2 has moved past the photoelectric cell 44 air under pressure will be released from the upper end of the cylinder 10 while the pressure in its lower end is 35 pounds per square inch to sustain the weight of the hold-down assembly 25 and the barker ring 6 until the trailing end of the log has passed through the barker ring. Air under sufficient pressure will then be supplied to the lower end of the jack cylinder 10, such as 60 pounds per square inch, to raise the hold-down assembly 25 and the barker ring into their predetermined positions of rest ready for the next log to be moved into the barker. When the trailing end of such smaller log has passed the photoelectric cell 45, air under pressure, such as 30 pounds per square inch, will also be supplied to the lower end of jack cylinder 40 to raise the outfeed hold-down assembly.

I claim:

1. In a rotary-ring log barker including a rotary barker ring, log transport means for moving a log lengthwise through such ring, infeed hold-down means engageable with a log on the infeed side of the barker ring, and outfeed hold-down means engageable with a log on the outfeed side of the barker ring, the improvement which comprises infeed hold-down supporting means supporting the infeed hold-down means for elevational movement, means supporting the barker ring for elevational movement, and lever means connecting said infeed hold-down supporting means and said barker ring supporting means and operable to effect coordinated elevational adjustment thereof.

2. In the log barker defined in claim 1, the lever means being operable to effect elevational adjustment of the infeed hold-down supporting means through a distance approximately twice as great as the elevational adjustment of the barker ring supporting means.

3. In the log barker defined in claim 1, the lever means supporting the infeed hold-down supporting means and the barker ring supporting means.

4. In the log barker defined in claim 3, the lever means having a supporting pivot, and the infeed hold-down supporting means and the barker ring supporting means being connected to the lever means, the infeed hold-down supporting means being connected to the lever means at a distance from said lever-supporting pivot approximately twice as great as the distance between said lever-supporting pivot and the connection of the barker ring supporting means to the lever means.

5. In the log barker defined in claim 3, means independent of the lever means supporting the outfeed hold-down means for elevational adjustment.

6. In the log barker defined in claim 3, sensing means for sensing the size of a log to be barked by the log barker, and means operable to swing the lever means in response to actuation of the said sensing means.

7. In the log barker defined in claim 6, and time delay means for delaying swinging of the lever means for a predetermined period of time after a log moving through the barker ring has moved out of a position in which the sensing means senses the size of such log.

8. In the log barker defined in claim 1, the means supporting the barker ring for elevational movement including a pneumatic bag and yieldable means placing the pneumatic bag under compression pressure for providing a somewhat yieldable resilient connection between said supporting means and the barker ring.

9. In a rotary-ring log barker including a rotary barker ring, log transport means for moving a log lengthwise through such ring, infeed hold-down means engageable with a log on the infeed side of the barker ring, and outfeed hold-down means engageable with a log on the outfeed side of the barker ring, the improvement which comprises means supporting the barker ring for elevational movement including a pneumatic bag and yieldable means placing the pneumatic bag under compression pressure for providing a somewhat yieldable resilient connection between said supporting means and the barker ring.

* * * * *

Disclaimer 3,709,269.—*Peter J. Cervenak*, Seattle, Wash. LOG BARKER RING POSITION CONTROLLER. Patent dated Jan. 9, 1973. Disclaimer filed Dec. 26, 1973, by the assignee, *Nicholson Manufacturing Company*.
Hereby enters this disclaimer to claims 1, 2 and 3 of said patent.
[*Official Gazette April 16, 1974.*]